United States Patent
Bartell et al.

(10) Patent No.: US 10,363,865 B2
(45) Date of Patent: Jul. 30, 2019

(54) SYSTEM AND METHOD FOR VEHICLE SAFETY LIGHTING

(71) Applicant: Ardmore Lighting, LLC, Calgary (CA)

(72) Inventors: David Bartell, Calgary (CA); Catalin Nicolae Petrescu, Kanata (CA)

(73) Assignee: Admore Lighting, LLC, Calgary (CA)

( * ) Notice: Subject to any disclaimer, the term of this patent is extended or adjusted under 35 U.S.C. 154(b) by 0 days.

(21) Appl. No.: 15/966,123

(22) Filed: Apr. 30, 2018

(65) Prior Publication Data

US 2018/0312105 A1    Nov. 1, 2018

Related U.S. Application Data

(60) Provisional application No. 62/491,481, filed on Apr. 28, 2017.

(51) Int. Cl.
*B60Q 1/44* (2006.01)
*G01P 15/08* (2006.01)
(Continued)

(52) U.S. Cl.
CPC .......... *B60Q 1/447* (2013.01); *B60Q 1/2696* (2013.01); *G01P 15/08* (2013.01); *G08B 5/38* (2013.01); *B60Q 2300/114* (2013.01)

(58) Field of Classification Search
CPC ............................. B60Q 1/447; B60Q 1/2696; B60Q 2300/114; G01P 15/08
(Continued)

(56) References Cited

U.S. PATENT DOCUMENTS 6,417,767 B1 *  7/2002  Carlson .................. B60Q 1/445
                                                     340/467
6,788,207 B2 *  9/2004  Wilkerson ................ B60T 7/22
                                                     340/435
(Continued)

OTHER PUBLICATIONS

DeWald, "AdMore SMT Light Bar with Smart Brake Technology," BMW Owners News, Feb. 2017, p. 24.
(Continued)

*Primary Examiner* — John A Tweel, Jr.
(74) *Attorney, Agent, or Firm* — NovoTechIP International PLLC

(57) ABSTRACT

Methods and systems for vehicle safety lighting are disclosed, including a system having a multi-axis accelerometer that detects acceleration of the vehicle along a first axis and a second axis normal to the first axis, and outputs a corresponding first axis acceleration measurement and a second axis acceleration measurement. A controller is coupled to the multi-axis accelerometer, and to an array of light emitter elements (LELs). The controller is configured to determine a vehicle deceleration, based at least in part on a combination of the first axis acceleration measurement and second axis acceleration measurement, and to detect the vehicle deceleration exceeding a brake light threshold and, based at least in part on the detection, output a deceleration light signal to the array of LELs. Digital filtering prevents operation of the safety lighting by accelerometer outputs unrelated to axial deceleration, such as will occur upon encountering a hill, or, in the case of a motorcycle or the like, leaning into a turn.

20 Claims, 6 Drawing Sheets

(51) Int. Cl.
*B60Q 1/26* (2006.01)
*G08B 5/38* (2006.01)

(58) Field of Classification Search
USPC .......................................................... 340/467
See application file for complete search history.

(56) References Cited

U.S. PATENT DOCUMENTS

| | | | |
|---|---|---|---|
| 6,911,905 B2* | 6/2005 | Carlson | B60Q 1/445 |
| | | | 340/467 |
| 8,841,999 B2 | 9/2014 | Ali et al. | |
| 9,266,431 B2 | 2/2016 | Ali et al. | |
| 2016/0167571 A1* | 6/2016 | Ali | B60Q 1/2673 |
| | | | 701/70 |
| 2017/0158118 A1* | 6/2017 | Lenker | B60Q 1/52 |
| 2018/0009372 A1* | 1/2018 | Hammock | B62J 6/04 |

OTHER PUBLICATIONS

Indiegogo available at https://www.indiegogo.com/projects/brakefree-the-smart-brake-light-for-motorcyclists#/.
Skene Lights available at https://www.skenelights.com/new-p3-with-decelerometer.

* cited by examiner

SYSTEM AND METHOD FOR VEHICLE SAFETY LIGHTING

CROSS REFERENCE TO RELATED APPLICATION

This application claims the benefit of priority from U.S. Provisional Patent Application Ser. No. 62/491,481 filed Apr. 28, 2017, and entitled "VEHICLE SAFETY LIGHTING SYSTEM," which is incorporated by reference herein in its entirety.

BACKGROUND

Brake lights of a vehicle are activated in response to the vehicle operator applying manual force to the vehicle's brake actuator(s), for example, the operator depressing the brake pedal or, for motorcycles, the rider/operator squeezing the hand brake lever or pressing the foot pedal. The brake lights thereby give drivers behind the vehicle immediate, attention capturing notice of the vehicle's friction braking deceleration, and therefore earlier opportunity to adjust their speed, e.g., apply their brakes, to avoid colliding with the operator's vehicle.

However, the brake lights warn drivers behind a vehicle only of brake deceleration; they give no warning to drivers behind a vehicle if it decelerates due to any other cause, e.g., engine braking from the operator reducing the engine throttle, or downshifting the transmission to a lower gear, or both. On the contrary, when a vehicle decelerates for a reason other than the operator applying the brakes, the first "alarm" to a driver behind it is that driver's realization that the distance between the driver's vehicle and the vehicle in front of him is closing rapidly. Unfortunately, due to factors such as vehicle speed and driver distraction, the realization sometimes is too late.

Acceleration sensing devices have been used to detect vehicle deceleration for brake light operation independently of intentional operation of the brake by a driver. However, acceleration measuring devices produce detection outputs in response to accelerations along each of multiple axes. Basing vehicle deceleration directly upon such multi-axial acceleration measurements can result in false indications of deceleration such as may occur when a vehicle, especially a motorcycle, is leaning into a turn or encountering changes in road grade, etc. Such false indication of deceleration, to drivers following the vehicle, can be inconvenient and even dangerous. A solution to these problems is needed.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
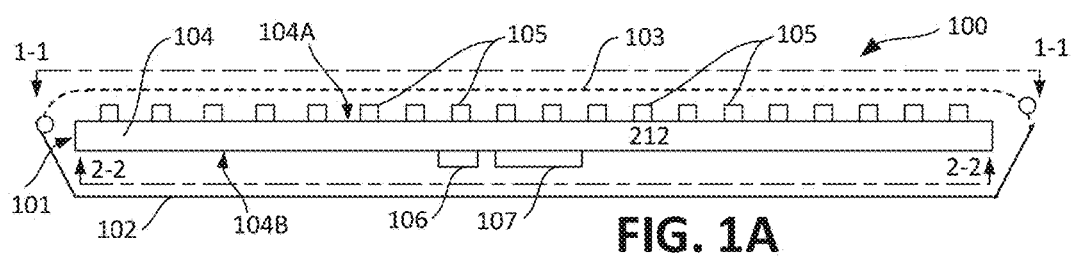
FIG. 1A shows a front cross-sectional view of an exemplary implementation of a vehicle safety lighting system according to various aspects of the disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

An exemplary vehicle safety lighting system according to disclosed aspects can include a light bar, having a support substrate and an array of light emitting elements (LELs), e.g., light emitting diodes (LEDs) mounted on an LEL support surface of the substrate. The light bar can be supported by a housing, configured for mounting to a rear-facing surface of the vehicle, such as a motorcycle, scooter, automobile, or truck. An implementation can include a multi-axis accelerometer, mechanically coupled to the vehicle, configured to detect acceleration of the vehicle along each of a plurality of axes, and to output a corresponding plurality of axis acceleration measurements. In an aspect, the plurality of axes can include a first axis and a second axis extending perpendicular to the first axis, and the axis acceleration measurements can include a corresponding first axis acceleration measurement and second axis acceleration measurement. The first axis can be an "axial" axis extending through the vehicle, parallel to the moving direction of the vehicle when travelling straight, and parallel to a zero-incline, flat road surface. The second axis can be a "lateral" axis, extending through the vehicle, generally in a side-to-side direction, where "side" is a side of the vehicle. In implementations where the vehicle safety lighting system is mounted to a motorcycle, the direction of the second axis relative to the direction of gravity can depend on the lean angle of the motorcycle as it leans, as will be described in greater detail in later sections.

Implementations can include a controller unit, coupled to the multi-axis accelerometer, and configured to determine a vehicle deceleration based at least in part on the plurality of axis measurements. The controller unit can be further configured to detect the vehicle deceleration exceeding a brake light activation threshold and, based at least in part on the detection, output a brake light activation signal to at least a sub-plurality of the LELs among the LEL array. In an aspect, the controller unit can be configured to generate the brake light activation signal in a form that causes the LEL array to light up in a sequential pattern, and in additional patterns as will be described in greater detail later.

The plurality of LELs within the LEL array can be of uniform color. In an alternative implementation, a plurality, or a sub-plurality of the LELs of the LEL array can be multi-color, for example, amber, red, and white. The multi-axis accelerometer can be configured to output the plurality of axis acceleration measurements as analog signals. In such a configuration, the controller unit can include an analog-to-digital (A/D) converter or, as one alternative, a separate A/D can be positioned between the multi-axis accelerometer and the controller unit.

In an aspect, the vehicle safety lighting system can include an interface from the controller to a communication port, e.g., micro-USB, or equivalent, coupled to a communication interface of the controller to a wireless link, e.g., a Bluetooth transceiver. The communication interface can provide, for example, a programmability of the controller unit with user-configurable or customizable settings, as well as convenient firmware upgrades.

As will be described, and as will be further appreciated upon reading this disclosure, implementations can include, and can provide, in a single integrated structure encased by a housing, an integrated user-configurable, user-updatable, brake light that can be activated by user application of friction brakes and by detection of vehicle deceleration from other causes, e.g., downshifting, and vehicle turn signals, ordinary tail light, and hazard light activation upon vehicle lean indicating an accident.

Figure 1B:
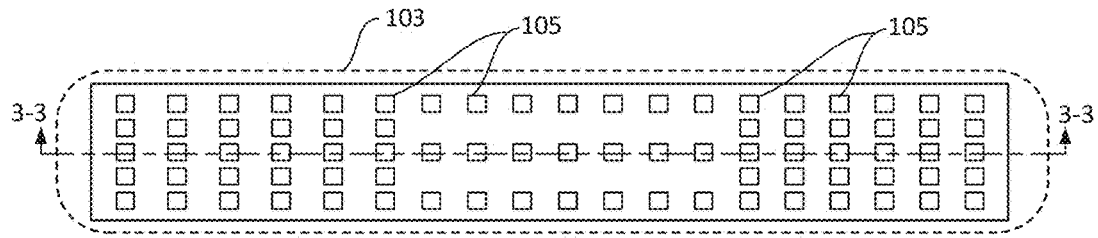
FIG. 1B is a top elevation view, from the FIG. 1A projection 1-1, showing one exemplary array of light emitting diodes (LEDs), elements (LELs) in one implementation of a vehicle safety lighting system according to various aspects.
Figure 1C:
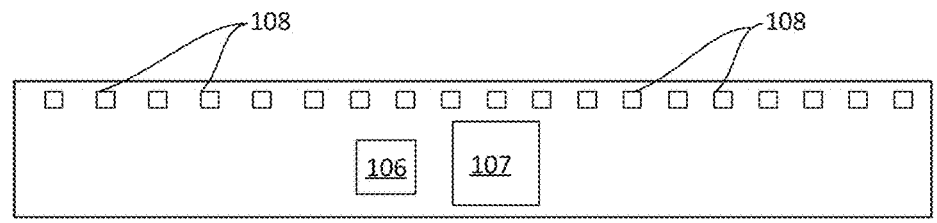
FIG. 1C is a bottom elevation view, from the FIG. 1A projection 2-2, showing one exemplary configuration of circuitry components for controlling the LEL array, in one implementation of a vehicle safety lighting system according to various aspects.

FIG. 1A shows a front, cross-sectional view of one implementation of a vehicle safety lighting system 100 according to one or more aspects of this disclosure. FIG. 1B shows a top projection of the vehicle safety lighting system 100, on the FIG. 1A projection plane 1-1. FIG. 1C shows a bottom projection of the vehicle safety lighting system 100, on the FIG. 1A projection plane 2-2. The FIG. 1A cross-cut projection is the FIG. 1B cross-cut projection plane 3-3. Referring to FIG. 1A, the vehicle safety lighting system 100 can include a multi-element light bar 101, supported within a housing 102 that can be covered with a light cover 103. In one aspect, the light cover 103 can be formed of a clear plastic, or a colored translucent plastic. Referring to FIG. 1A, the multi-element light bar 101 can include a support substrate 104, for example, a printed circuit board (PCB), having a first surface 104A that faces the light cover 103. The first surface 104A can support an LEL array 105. The LEL array 105 can be, but is not limited to being, configured as a row-column matrix or other array configuration. The LEL array 105 can be implemented as surface mount (SMT) LEDs.

The support substrate 104 can provide a second surface 104B, opposite the first surface 104A, that supports circuitry for selectively energizing or activating all of, or regions of, or patterns within the LEL array 105. Referring to FIG. 1C, the system 100 can include a multi-axis accelerometer 106, which can be a portion of the circuitry supported by the second surface 104B. The multi-axis accelerometer 106 can be coupled to a control unit 107, which can also be a portion of the circuitry on the second surface 104B. The control unit 107 can be coupled to the LEL array 105, by a coupling that can include, for example, conducting vias (not explicitly visible in FIG. 1) formed in the support substrate 104. In an aspect, coupling of the control unit 107 to the LEL array 105 can include MOSFET switches, such as the exemplary MOSFET switches 108.

In an implementation, the multi-axis accelerometer 106 can be a 3-axis accelerometer, configured to measure acceleration along each of three orthogonal axes. For purposes of description, the three axes can be referred to as the "Z" axis, "X" axis, and "Y" axis. The multi-axis accelerometer 106, in this configuration, can output an Z acceleration measurement, an X acceleration measurement, and a Y acceleration measurement.

In an implementation, the housing 102, support substrate 104, and multi-axis accelerometer 106 can be configured such that the Z axis is aligned with a center longitudinal axis of the vehicle. The center longitudinal axis of the vehicle can be co-linear with the direction of the vehicle when traveling straight. The Z axis will be alternatively referred to as the "axial" axis. The above-described configuration of the housing 102, support substrate 104, and multi-axis accelerometer 106 can also align the X axis perpendicular to the Z axis, such that Z and X axes form a plane that, when the vehicle is upright on a zero-incline surface, is normal to the direction of gravity. The X axis will be alternatively referred to as the "lateral" axis. The Y axis can be normal to the X axis and to the Z axis, in a configuration such that the Y axis can align with the direction of gravity when the vehicle is fully upright (e.g., zero lean) on a zero-incline surface.

In an implementation, the X, Y, and Z acceleration measurements can be output as continuous analog signals, and the vehicle safety lighting system 100 can include a sampling of the signals. In an example implementation, sampling can be of all three axes, to generate Z, X, and Y acceleration samples, which can be processed, for example, by computational resources of the control unit 107 as will be described in greater detail later in this disclosure. The sampling can be provided, in an aspect, by an analog-to-digital (A/D) converter within the control unit 107. In an alternative, the A/D converter can be implemented as a separate device that receives the Z, X, and Y acceleration measurements from the multi-axis accelerometer 106, and feeds corresponding Z, X, and Y acceleration samples to the control unit 107.

It will be understood that the Z (axial), X (lateral), and Y axes of the multi-axis accelerometer 106 are relative to the vehicle. Accordingly, in an aspect, the control unit 107 can be configured to apply an axis rotation to acceleration samples along one or more of the axes. In an implementation, the axis rotation can be configured to obtain a sequence of corrected Z acceleration samples, indicating a net acceleration vector aligned with the Z or longitudinal axis of the vehicle. Benefits and advantages of the rotation producing the corrected Z acceleration samples can be illustrated by a scenario in which another vehicle is behind the subject vehicle travelling at constant speed, having its longitudinal axis in the same direction, or approximately the same direction as the measured vehicle. In such a scenario, the net acceleration of the measured vehicle in the direction of its longitudinal axis can translate directly to and immediately to rapid changes, e.g., increase or decrease, of the spacing between the rear of that vehicle and the front of the trailing vehicle.

In an aspect, the control unit 107 can be configured to compare the sequence of corrected Z acceleration samples to a deceleration threshold and, when the threshold is exceeded, generate a deceleration warning signal. It will be understood that operations of deceleration based triggering of a brake light illumination from the LEL array 105, according to this aspect, do not require generation of corrected X acceleration samples.

In one alternative implementation, the Y acceleration samples can be omitted, and the above-described rotation that generates the corrected Z acceleration samples can be based only on the Z and X samples. One example of such implementation can include using a two-axis accelerometer as the multi-axis accelerometer 106, providing only Z samples and X samples. Another example implementation can use the above-described 3 axis accelerometer for the multi-axis accelerometer 106, while discarding the Y samples.

In a further implementation, the control unit 107, or another processing resource can be further configured to apply "noise" filtering operations to the Z acceleration measurements, or to the Z and X measurements, or to all of the axis measurements. Features and benefits can include removing "noise" from the Z acceleration measurements, or from the Z and X measurements, or from the Z, X, and Y acceleration samples. In an aspect, the noise can be removed by coupling a respective analog filter to one or more outputs of the multi-axis accelerometer 106, e.g., to the Z output, to the Z and X output, or to all of the Z, X and Y outputs. In another aspect, the noise filter or filters can be configured as respective digital low pass filters that, in turn, operate on the digital output from one, or two, or (if three samples are used) to all three. In another aspect, the noise filter(s) can be implemented as a combination one or more of above-described analog filters, and a digital filter for one or more of the sampler outputs. Benefits and advantages of any of these implementations can include a decrease in false alarms arising from events such as the vehicle hitting a pothole. It will be understood, regarding the digital noise filtering, that exemplary implementations can configure such digital filters to operate prior to the above-described axis rotation, or after the axis rotation, or both.

In an implementation, the control unit 107 can be configured to generate the deceleration warning signal as a pulse width modulation (PWM), to provide for control of the brightness of the light generated by the LEL array 105.

Figure 2:
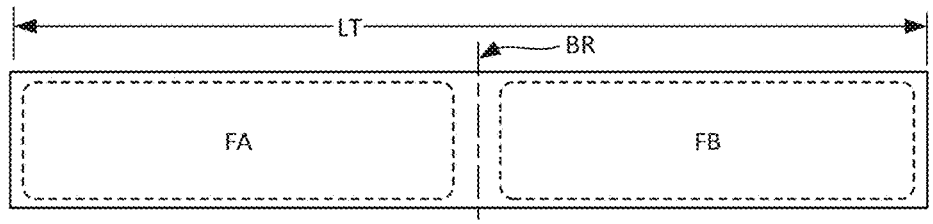
FIG. 2 shows an LEL support surface of an exemplary substrate of an implementation according to FIGS. 1A-1C, without the LEL array, annotated to illustrate a left LEL array area and a right LEL array area, in one implementation of a vehicle safety lighting system according to various aspects.

FIG. 2 shows the first surface 104A without the LEL array 105. Referring to FIG. 2, the first surface can include an LEL first laterally extending support area, labeled "FA," and an LEL second laterally extending support area, labeled "FB." As illustrated, the first surface 104A can have a length LT. In an implementation where the vehicle safety lighting system 100 is mounted to a vehicle, LT can extend parallel to the Y axis, i.e., in a lateral or left-to-right direction relative to the vehicle. The LEL array may be mounted at various places on the vehicle, facing rearward, such as above or below a license tag, elsewhere on the body of the vehicle, or, in the case of a motorcycle or the like, at the rear of a set of panniers or top case.

For purposes of description, a bisector reference line BR appears on FIG. 2, symmetrical between FA and FB. In an implementation where the vehicle safety lighting system 100 is mounted on the rear of a vehicle, the positioning can place the bisector reference line halfway between the left and right of the vehicle. Accordingly, facing toward the rear of the vehicle, FA can be to the left of the vehicle center, and FB can be to the right of the vehicle center. Therefore, for purposes of description, the LEL array first and second laterally extending support areas FA, FB will be alternatively referred to as the "left LEL array area" and the "right LEL array area," respectively. In an implementation that mounts the vehicle safety lighting system 100 to the back of a motorcycle, the mounting can align BR with the lateral centerline of the motorcycle. Mounted as such, when viewed from a point facing toward the rear of the motorcycle, the left LEL array area and right LEL array area can be to the left and to the right, respectively, of the motorcycle's lateral centerline.

Figure 3:
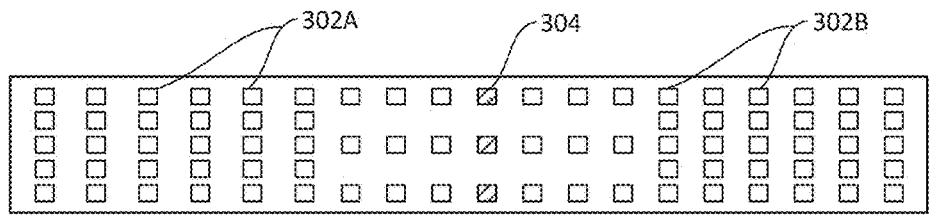
FIG. 3 shows an exemplary LEL array configuration, on the FIG. 2 arrangement of the LEL support surface, in one implementation of a vehicle safety lighting system according to various aspects.

FIG. 3 shows the above-described FIG. 2 partitioning, with multicolor LELs 302A (e.g., an array, or region of an array of multicolor LELs) in the left LEL array area and multicolor LELs 302B (e.g., another array or another region of an array of multicolor LELs) in the right LEL array area. The multicolor LELs 302A and 302B can be, for example, red/amber LELs. In an aspect, white LELs 304 can be positioned between the left LEL array area and the right LEL array area, or substantially aligned with the bisector reference line BR.

Figure 4:
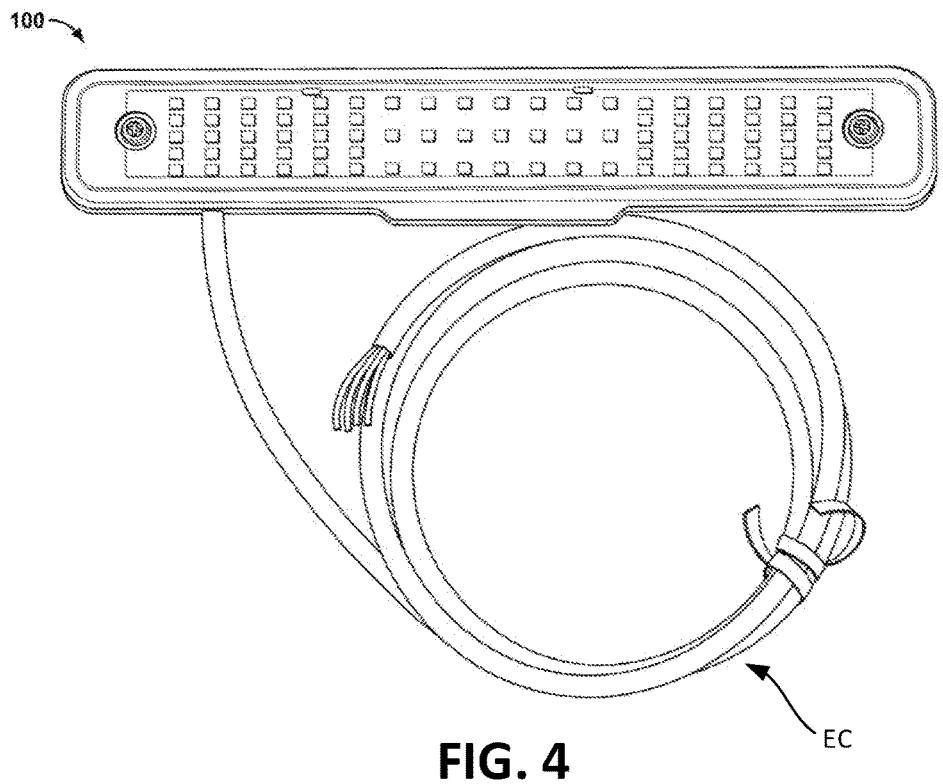
FIG. 4 shows an exemplary implementation of a vehicle safety lighting system according to various aspects, in a combination with a cable for coupling to vehicle power and vehicle control signals.

In an implementation, the control unit 107 can be configured to receive, from the vehicle, conventional human operator actuated signals, such as a brake signal, left turn signal, and right turn signal. The control unit 107 can be configured to obtain these signals, for example, via a CAN-BUS-to-SIGNALS interface or via an interface to another control bus of the vehicle. Referring to FIG. 4, such interfacing can include an electrical cable, such as the exemplary cable labeled "EC," which can also connect the vehicle safety lighting system 100 to a vehicle power supply, for example 12 volts.

In an aspect, the vehicle safety lighting system 100 can include a USB, micro-USB or equivalent receptacle/port, and/or include a Bluetooth BLE or equivalent wireless interface, for user interface to the control unit 107. The user interface can provide the user with capability, for example, of various customization or configuration of the control unit 107, as well as firmware updates. In an aspect, a Bluetooth BLE or equivalent wireless interface can be implemented as a Bluetooth or equivalent "dongle" that can plug into a USB, micro-USB or equivalent receptacle/port.

Figure 5:
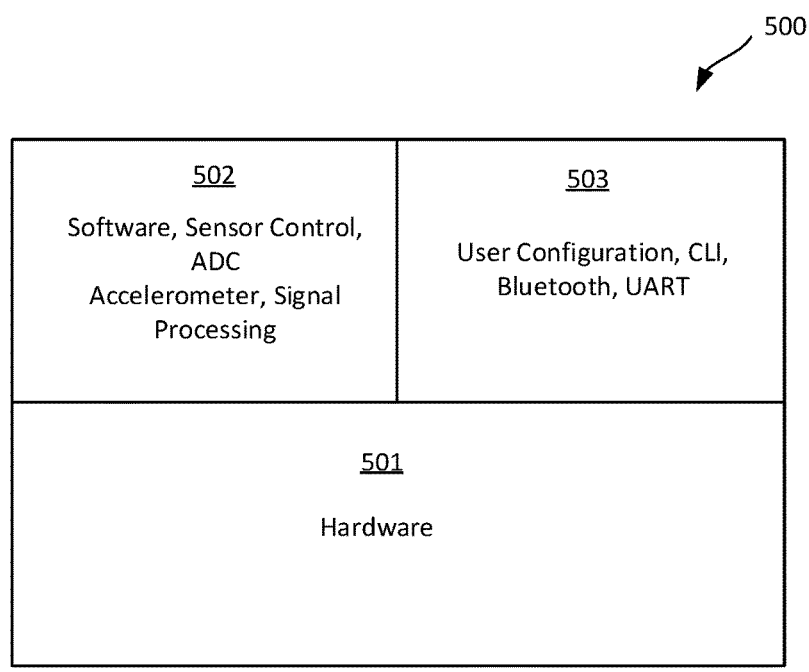
FIG. 5 shows a functional block diagram of one exemplary implementation of a vehicle safety lighting system according to one or more aspects of the disclosure.

FIG. 5 shows a simplified block diagram of one implementation 500 of a vehicle safety lighting system according to one or more aspects of this disclosure. As shown, the safety lighting system 500 can include hardware resources 501, such as an LEL array supported on a substrate, in a housing, and can include deceleration detection based LEL control resources 502. The deceleration detection based LEL control resources 502 can include a multi-axis accelerometer, such as the accelerometer 106, signal processing resources, such as a microprocessor that includes a computation logic, an instruction memory and a data buffer memory for storing received Z-samples, or Z samples and X-samples, and Z, X, and Y samples. The signal processing resources 502 can also include an A/D converter, and computer-executable software instructions that can be stored, for example, in the instruction memory of the microprocessor. The safety lighting system 500 can also include user configuration resources 503, such as command line interface (CLI), wireless interface, e.g., Bluetooth, and a universal asynchronous receiver transmitter (UART).

Figure 6:
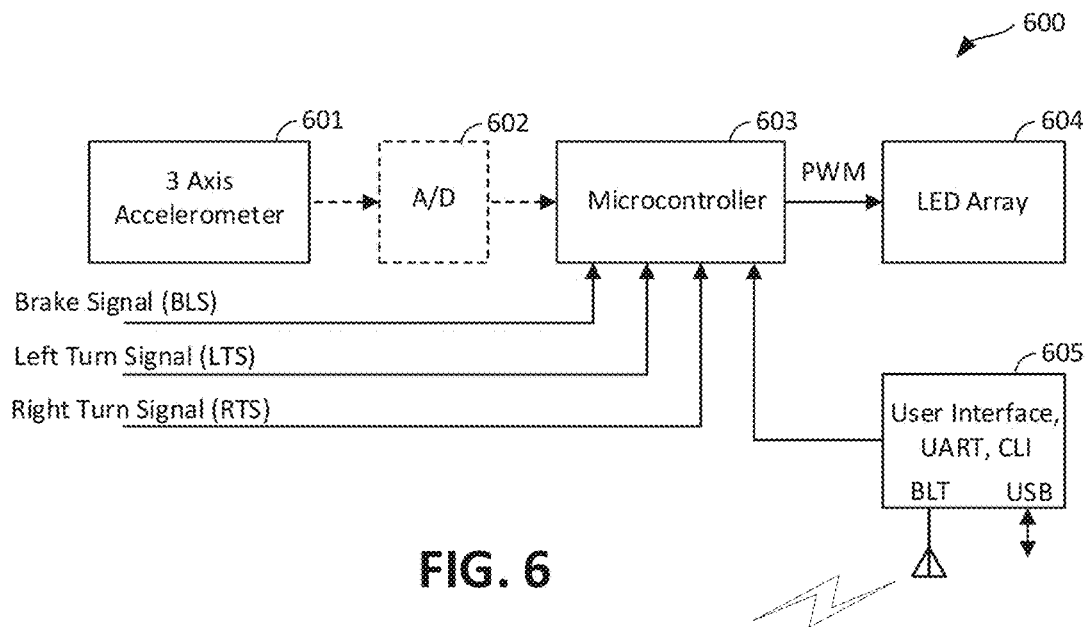
FIG. 6 shows a functional block schematic of a vehicle safety lighting system according to various aspects, in an implementation that interfaces with an exemplary vehicle brake light signal and turn signal control signal.

FIG. 6 shows a functional block schematic of a vehicle safety lighting system 600 according to various aspects, in an implementation that interfaces with an exemplary vehicle brake light signal, labeled BLS, a vehicle left turn signal control signal, labeled LTS, and a right turn signal control signal, labeled RTS. The signal LTS, when activated, indicates that a left turn signal is to be activated. RTS, when activated, indicates a right turn signal is to be activated. The signals RTS and LTS can be initiated, for example, by manual action of the driver or rider, e.g., moving a turn signal lever or handlebar switch. BTS, when activated, e.g., by a driver depressing a brake pedal or brake lever, in turn activates a brake light to warn drivers behind the vehicle of impending deceleration by friction brakes.

The system 600 can include a multi-axis accelerometer 601, an A/D converter 602, and a controller 603. The multi-axis accelerometer 601 can be implemented as the multi-axis accelerometer 106 described above, and the controller 603 can be the above-described control unit 107. The A/D converter 602 is shown in dotted lines, as it can be implemented, for example, as a feature of the controller 603. In an aspect, the controller 603, and the above-described control unit 107, can include a buffer memory (not separately visible in FIG. 5) for storing and retrieving for processing the X, Y, and Z acceleration samples. The system 600 can include an LEL array 604 coupled to the controller 603. The LEL array 604 can be implemented according to the light bar 101, with its LEL array 105 described above. The system 600 can also include user interface 605 to the controller 603. The interface can include, for example, a hard cable plug-in, e.g., a mini USB receptacle/port, or a Bluetooth or equivalent wireless transceiver, or both. The interface 605 can also include, as described above, a Bluetooth or equivalent wireless transceiver, implemented for example as a dongle, that can plug into a mini USB or equivalent receptacle/port. In an aspect, the user interface 605 can include a universal asynchronous receiver/transmitter (UART) and can include a command line interface (CLI). Various features and exemplary processes and operations thereof, of the vehicle safety lighting system 600 will be described in reference to FIGS. 7-9.

Figure 7:
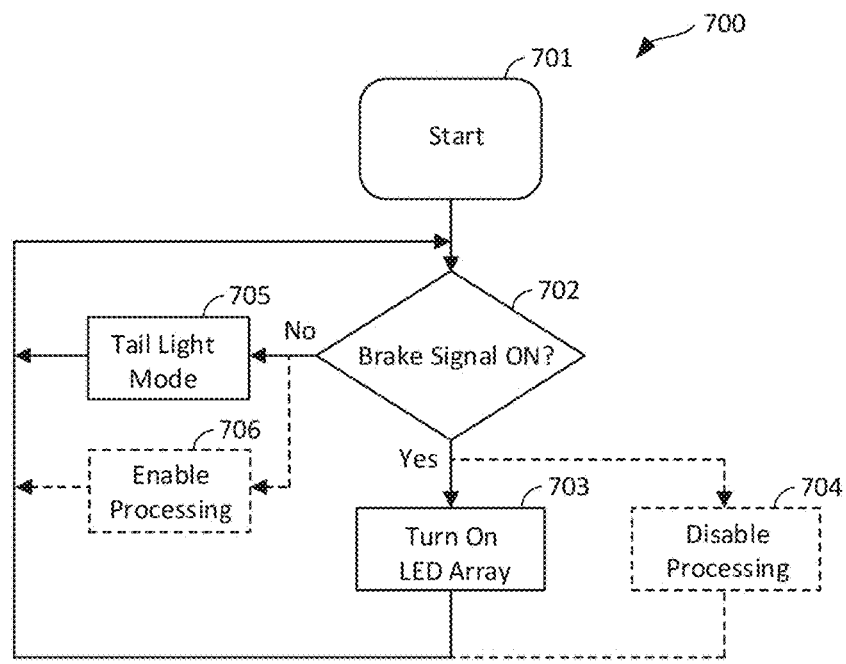
FIG. 7 is a flow diagram showing an exemplary flow of operations in a process for vehicle safety lighting that includes an inter-operation with vehicle brake light signals, in an exemplary vehicle safety lighting system according to one or more aspects of the disclosure.

FIG. 7 is a flow diagram showing an exemplary flow 700 of operations in a process for vehicle safety lighting that includes an inter-operation with vehicle brake light signals, in an exemplary vehicle safety lighting system according to one or more aspects of the disclosure. An operation according to the flow 700 can begin at an arbitrary start 701, for example, upon the vehicle operator starting the engine of the vehicle or, in the case of a plug-in hybrid or all electric vehicle, upon the operator initiating a vehicle departure. The flow 700 can proceed to 702 where the controller (e.g., the FIG. 1 control unit 107 or FIG. 6 controller 603) can determine whether the brake BTS signal is activated. If the answer is "YES," the flow 700 can proceed to 703 and activate, as a brake light of the vehicle, LELs of an LEL array, e.g., the above described LEL array 105. In an aspect, operations at 703 can include the controller, (e.g., the control unit 107 or the controller 603) activating all of, or particular regions, areas, or patterns of the LEL array 604, to notify drivers following the vehicle by an LEL lighting pattern associated with application of the brakes. In an implementation, the activated LELs of the LEL array 604 can include red LELs, distributed over both the left LEL array area and right LEL array area of the light bar. The activation can include, for example, generating the LEL activation signals at a particular PWM width to obtain a given brightness. In an aspect, operations at 703 can include activating white LELs, such as the white LELs 304 described above, within an LEL array. In an aspect, associated with operations at 703, the flow 700 can include a disabling, at 704, of processing for detecting a deceleration of the vehicle. Such disabling can include, for example, disabling a clock input to the controller, or to the above-described A/D converter, if separate from the controller. Alternatively, the disabling can include switching the controller (e.g., the control unit 107 or controller 603) to a "stand-by" or equivalent state. In contrast, if the controller determines that the brake signal is not activated (e.g., off or low), the red LELs of the LEL array may be off or in a low-brightness tail-light mode. From 703, or 703 and 704, the flow 700 can loop back to 702 where the controller can determine whether the brake BTS signal is still activated. If the answer is "YES," the above-described loop through 703, or 703 and 704, can repeat.

Referring to FIG. 7, if the determination at 702 is that the brake signal BTS is not activated, the flow can proceed to 705 and switch, for example, to a tail-light mode. The tail light mode can include the controller activating, for example, all of the LEL array, or particular regions, areas, or patterns within the LEL array at a given brightness associated with normal tail light operation. In an aspect, operations at 705 can also switch off all energization of all LELs in the LEL array, for example, in response to a "lights off" mode of the vehicle. In an implementation that includes the disabling at 704, the flow 700 can include, in association with a "NO" at 702, an enabling at 706 of deceleration detection processing. From 705, or 705 and 706, the flow 700 can loop back to 702 where the controller (e.g., control unit 107 or controller 603) can determine whether the brake BTS signal is being activated. If the answer is "NO," the above-described loop through 705, or 705 and 706, can repeat. If the answer is "YES," the flow 700 can perform the above-described loop through 703, or 703 and 704, then return to 702.

Figure 8:
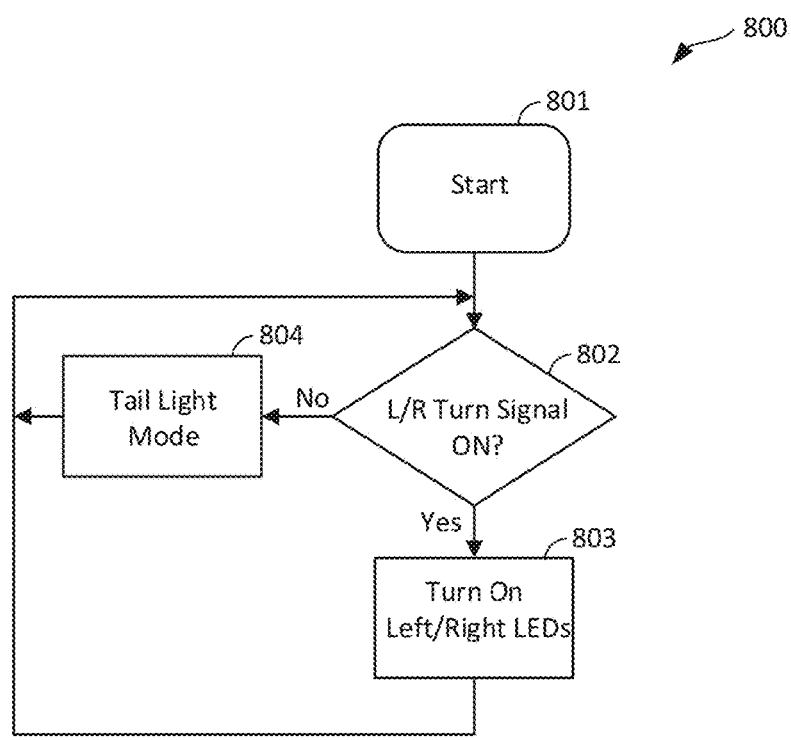
FIG. 8 is a flow diagram showing an exemplary flow of operations in a process for vehicle safety lighting that includes an inter-operation with vehicle turn control signals, in an exemplary vehicle safety lighting system according to one or more aspects of the disclosure.

FIG. 8 is a flow diagram showing an exemplary flow 800 of operations in a process for vehicle safety lighting that includes an inter-operation with vehicle left-right turn signals, in an exemplary vehicle safety lighting system according to one or more aspects of the disclosure. Operation according to the flow 800 can begin at an arbitrary start 801 that can be, for example, the same as the above-described arbitrary start 701. The flow 800 can proceed to 802 where the controller (e.g., the FIG. 6 controller 603) can determine whether the left turn signal LTS or right turn signal RTS activated. If the answer is "YES" the flow 800 can proceed to 803 where the controller can activate a given region, area, or pattern of amber LELs that can be within the LEL array. In an aspect, operations at 803 can include activating amber LELs within a region or area of the LEL array located on a corresponding side of the light bar. For example, corresponding to LTS, operations at 803 can include activating all of the amber LELs or, for example, a pattern of the amber LELs of the LEL array 105 that are within the FIG. 2 left array region FA of the light bar 101. Likewise, corresponding to RTS, operations at 803 can include activating all of the amber LELs, or a pattern of the amber LELs of the LEL array 105 that are within the FIG. 2 right array region FB of the light bar 101. In an implementation, the controller can be configured such that operations at 803 can include the controller, upon detecting the brake lights are active (e.g., a symmetrical pattern of lit red LEDs of an array in 302A and in 302B), deactivating the brake light located on the same side as the activated turn light. For example, the left brake light (e.g., red LELs of the LEL array 105 in the FIG. 2 left array region FA) may be deactivated or switched off if the left turn signal is on (e.g., if LTS is received), and the right brake light may be deactivated or turned off (e.g., red LELs of the LEL array 105 in the FIG. 2 right region FB) if the right turn signal is on (e.g., RTS is received). Referring to FIG. 8, the controller can be configured such that, upon determining at 802 that neither the left turn signal nor right turn signal is activated (e.g., off or low), the controller can switch the amber LELs of the LEL array off or into a low-brightness tail-light mode.

As described above, a vehicle safety lighting system such as the system 100 can be configured such that the brake lights can be automatically activated in response to deceleration measured by the multi-axis accelerometer, such as deceleration caused by use of the engine brake, downshifting, or the like. In an aspect, systems such the system 100 can include processing and filtering operations, for example, configuration of the controller, to prevent or acceptably reduce the frequency of the brake lights being erroneously activated as a result of the vehicle climbing or descending a hill, turning or leaning, and the like. In particular, when a vehicle such as a motorcycle climbs a hill, descends a hill, turns, or leans sideways (left/right), the accelerometer will detect an acceleration or deceleration in a lateral (left/right) or axial (front/back) direction. However, in such situations, the brake light should not be activated unless the vehicle is also decelerating along the axial direction. Filtering and other processing in accordance within disclosure can provide solutions.

Figure 9:
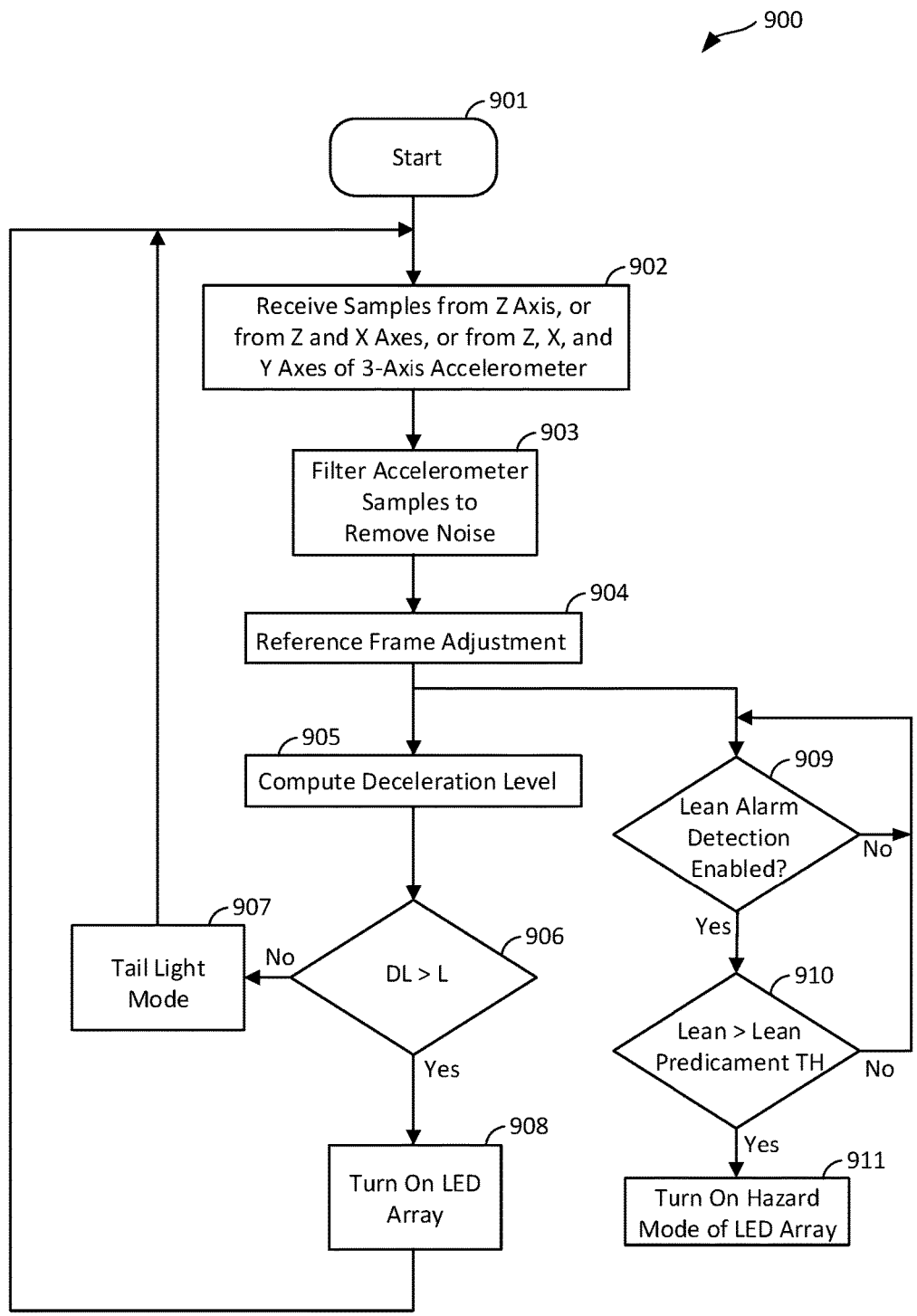
FIG. 9 is a flow diagram showing an exemplary flow of operations in a process for vehicle safety lighting that includes a filtering to remove noise from the accelerometer measurements, and a filtering to reduce false detections of deceleration, in an exemplary vehicle safety lighting system according to one or more aspects of the disclosure.

FIG. 9 is a flow diagram showing an exemplary flow 900 of operations in a process for vehicle safety lighting that includes a filtering to remove noise from the accelerometer measurements, and a filtering to reduce false detections of deceleration, in an exemplary vehicle safety lighting system according to one or more aspects of the disclosure. In an aspect, filtering to reduce false detections of deceleration can include a reference axis rotation, correcting for lean and incline (e.g., going up a hill) of the vehicle. The described filtering operations may be performed, for example, by the system controller, e.g., the above-described control unit 107 or controller 603.

Operation according to the flow 900 can begin at arbitrary start 901 that can be, for example, the above-described arbitrary start 701. The flow 900 can then proceed to 902 where the multi-axis accelerometer provides to the controller (e.g., the above-described control unit 107, or controller 603) two continuous analog output signals, namely, a first axis or Z-axis acceleration signal, and a second axis or X-axis acceleration signal and, in an aspect, can also provide a third axis or Y-axis acceleration signal corresponding to acceleration measurement along the three (i.e., Z, X, Y) distinct axes. Operations at 902 can include receiving the Z-axis acceleration signal and X-axis acceleration signal, or Z, X and Y axis acceleration signals and sampling the signals, for example, at periodic intervals. The output of the sampling can be first axis, or Z-axis measurement samples, second axis or X-axis measurement samples and, in an aspect, third axis or Y-axis measurement samples. Alternatively, a separate A/D converter can sample the accelerometer analog output signals Z and X, or Z, X, and Y output to the controller the first axis or Z-axis measurement samples and second axis or X-axis measurement samples and, in an aspect, third axis or Y-axis measurement samples. The intervals can be according to a clock input, to the controller or separate A/D converter. For purposes of example, one sampling interval can be 8 milliseconds (ms). It will be understood that 8 ms is not intended as a limitation and is not intended as a statement of preference. Instead, practices of vehicle safety lighting systems and methods according to the present disclosure can employ sampling intervals less than 8 ms and can employ sampling intervals greater than 8 ms.

Operations at 902 can also include storing the first axis or Z-axis measurement samples, second axis or X-axis measurement samples, and third axis or Y-axis measurement samples in a buffer memory of the controller. In an aspect, the flow 900 can proceed from 902 to 903 and apply filtering operations, e.g., a smoothing filter, to remove noise that may be present in the signals received from the accelerometer. In an implementation, the filtering operations at 903 can be performed on the Z-axis measurement samples, X-axis measurement samples, and Y-axis measurement samples, e.g., by retrieving the samples from the buffer memory and feeding them to computational resources of the controller. Alternatively, or additionally, operations in the flow 900 can include analog filtering any one of, or sub-combination of, or all three of the accelerometer analog output signals, i.e., Z, X, and Y, prior to sampling.

Operations in the flow 900 can proceed from the filtering at 903, or directly from 902 if 903 is omitted, to applying operations at 904 that provide a reference frame rotation or adjustment. In an aspect, operations at 904 can be a filtering, configured to adjust or rotate the reference frame of the Z-axis measurement samples, or Z-axis and X-axis measurement samples, or Z, X, and Y axis measurement samples and output, for example, filtered Z-axis acceleration samples, aligned with an axial direction of the vehicle (e.g., front/back). In an implementation, the rotation can also output filtered second axis or X-axis acceleration samples, aligned with a lateral direction of the vehicle (e.g., left/right). In an aspect, the operations at 904 can be further configured to output filtered third axis or Y-axis acceleration samples, aligned with a direction of gravity. In the rotated reference frame, the filtered Z-axis acceleration samples, being aligned with the axial direction, can be indicative of deceleration of the vehicle in its direction of forward travel, which affects the distance between the rear of the instant vehicle and the front of a following vehicle moving at constant speed. The filtered X-axis acceleration samples can be indicative of a leaning/turning of the vehicle.

In an implementation, the flow 900 can proceed from the reference frame filtering at 904 to a deceleration measurement at 905, which can generate the measured deceleration as "DL." In an aspect, since the filtered Z-axis acceleration samples, as described above, are aligned with the axial direction of the vehicle, operations at 905 can measure the deceleration using only the filtered Z-axis acceleration samples. Operations in the flow 900 can proceed from 905 to operations at 906 that compare the deceleration DL to a given deceleration sensitivity threshold "L." If the deceleration signal is less than L, i.e., the comparison at 906 produces a "NO," the flow 900 can proceed to 907, where the controller (e.g., the control unit 107) can maintain the LEL array (e.g., the LEL array 105, or the LELs 302A and 302B), in a tail-light or running-light mode (e.g., in a low-brightness mode). The flow 900 can then loop back to 902. If at 906 the deceleration signal is greater than the sensitivity threshold L, i.e., the comparison at 906 produces a "YES," the flow 900 can proceed to 908, where the controller can cause the LEL array to turn on (e.g., in a high-brightness mode). In an aspect, the sensitivity threshold L may be user-adjustable, for example, through the above-described USB port or Bluetooth interface to the control unit 107.

Benefits of applying either or both of the above-described filtering operations at 903 and 904 can include avoidance or preemption of false positive identifications of deceleration that can occur as a result of the vehicle performing a left turn, performing a right turn, swerving, climbing a hill, descending a hill, going over a bump or obstacle, hitting a pothole, or the like. In an aspect, filtering operations at 904 can be configured to detect, based at least in part on the filtered first axis acceleration samples and filtered second axis acceleration samples, or on the filtered first, second, and third axis acceleration samples, a leaning of the vehicle. The controller can be further configured to preempt output of the deceleration light activation signal, based at least in part on its detection of leaning of the vehicle.

In an aspect, either or both of the above-described filtering operations at 903 and 904 can be configured to process the samples associated with the Z axis separately from the samples associated with the X axis and, if used, each the Y axis of the multi-axis accelerometer to avoid or preempt false positive identifications. For example, to avoid or preempt false positive identification of left/right turns, the controller (e.g., the control unit 107) can be configured to process the X or lateral samples separately from the Z or axial samples and, if included, from the Y samples. In the same or other examples, the controller can be configured to jointly process the samples associated with multiple ones of the axes (e.g., Z and X, Z and Y, or Z, X, and Y) of the accelerometer, to avoid or preempt false positive identifications. For example, to avoid or preempt false positive identification due to bumps and potholes, the Z, X, and/or Y (if used) acceleration samples can be jointly processed, to exploit concurrent acceleration artifacts in multiple different axes, which can be associated with driving over a bump, pothole, or the like.

In accordance with the processes described above, the controller can distinguish between deceleration signals resulting from the vehicle decelerating and deceleration signals resulting from the vehicle turning/leaning, climbing/descending, or going over a bump or pothole. If the detected deceleration samples are determined to result from the vehicle turning/leaning (i.e., as a result of the vehicle turning left or right), climbing/descending, or going over a bump or pothole, the brake light LELs of the LEL array are not activated. This can be implemented, for example, as a preemption of the brake light activation signal. However, if the detected deceleration samples are determined not to result from the vehicle turning/leaning, climbing/descending, or going over a bump or pothole, the controller can control the switches (e.g., FET switches 108) to activate the brake light LEL array.

In normal operating mode and in deceleration-caused activation, and all other aspects of LEL activation described above, the controller can control the activation, i.e., the LEL array brightness, via PWM control of switches (e.g., FET switches 108). In such aspects, a high duty cycle PWM can provide a higher lighting intensity, while a lower duty cycle PWM can provide a lower lighting intensity.

Referring to FIG. 9, in an implementation, the controller (e.g., control unit) can be further configured to detect, upon an enablement at 909, for example, by a background process at 910, a leaning of the vehicle being greater than a vehicle lean predicament threshold. The vehicle lean predicament threshold can be set such that a vehicle orientation meeting or exceeding the threshold cannot occur through normal operation and, instead, would occur only if the vehicle—e.g., a motorcycle—had been involved in an accident. In an aspect, the implementation can include, at 910, a determination of a lean angle, based at least in part a combination of the second axis acceleration measurement, and the third axis measurement, and a comparison of the determined lean angle to the vehicle lean predicament threshold. In an aspect, upon operations at 910 determining the vehicle lean to exceed the lean predicament threshold the flow 900 can proceed to 911, where the controller can activate LELs from among the LEL array (e.g., the LEL array 105) according to a hazard lighting configuration. The hazard lighting configuration can include, for example, a flashing of amber LELs among the LEL array. The flashing and the brightness can be, for example, such as exhibited by vehicle hazard lights. Regarding the specific value(s) of the vehicle lean predicament threshold, this can be in part vehicle-specific. For purposes of illustration, one exemplary value of the vehicle lean predicament threshold can be 70 degrees off-vertical, or approximately 70 degrees off-vertical. This is only an example, and is not intended as a limitation, as the vehicle lean predicament threshold can be set, for example, at a value less than 70 degrees or greater than 70 degrees.

Figure 10:
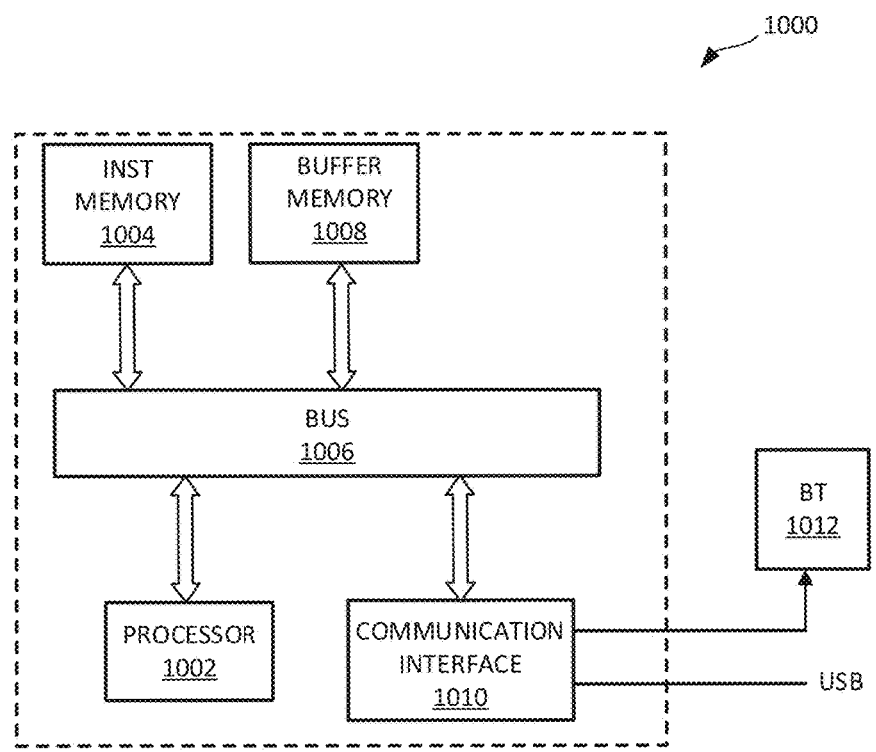
FIG. 10 is a functional block diagram of an exemplary computer system upon which aspects of this disclosure may be implemented.

FIG. 10 is a block diagram illustrating a computer system 1000 upon which aspects of this disclosure may be implemented, such as, but not limited to, the control unit 107, or the controller 604. It will be understood that logic blocks illustrated in FIG. 10 represent functions, and do not necessarily correspond to particular hardware on a one-to-one basis. The computer system 1000 can include a data processor 1002, instruction memory 1004, and a buffer memory 1006, coupled by a bus 1008.

The instruction memory 1006 can include a tangible medium retrievably storing computer-readable instructions, that when executed by the data processor 1002 cause the processor to perform operations, such as described in reference to FIGS. 7, 8, and 9.

The computer system 1000 can also include a communications interface 1010, configured to interface to external devices through a micro USB port and through a Bluetooth transmitter/receiver 1012.

The programming, including firmware, can be upgradeable and configurable by a customer or end-user. The functionalities configurable by the customer/end-user can include: brightness level, deceleration sensitivity, brake light modulation, white strobe light, license plate light and more. For example, the integrated super-bright white license plate light can be set to "On" or "Off" to accommodate mounting above license plate. As another example, brake light modulation can be adjusted by the end-user, e.g., set to "Off" or to a desired number of flashes of the white strobe light LELs, and/or to set a unique flashing pattern (strobe) in brake light mode (can be set to "On" or "Off") of the super bright white LELs. As a further example, the brightness level of the brake light can be adjusted by the end-user. As another example, progressive/sequential patterns of activation of the amber turn signals can be programmed for activation when the turn signals are used. A micro-USB port, Bluetooth or BLE transceiver, universal asynchronous receiver/transmitter (UART), command line interface (CLI), and/or the like, can provide connectivity for firmware upgrades and to access a proprietary configurator software suite for setting user definable options. The vehicle safety lighting system can be programmable via computer, mobile phone, or the like, via wired and/or wireless (e.g., Bluetooth) connection.

As described above, features and benefits of a vehicle safety lighting system according to this disclosure can include detection of rapid deceleration of the vehicle, and automatic activation of the brake lights. Features can also include programmability, e.g., configurability and adjustability by the customer or end-user, for example, capability of adjusting the sensitivity threshold L at which the controller (e.g., the control unit 107 or controller 603) will activate the brake light mode of the LEL array. Implementation can include, for example, a smart phone, a laptop computer, or a note pad, having Bluetooth or an equivalent wireless communication capability, and an application that can be downloaded, e.g., from an "app" store, and installed. In an implementation, the downloadable application and the control unit 107 can be configured such that the brake light sensitivity can be set at any among a pre-stored plurality of threshold settings, e.g., low, medium, or high, or at one among an integer "R" number of threshold increments, such as "1," "2," . . . "R." In an aspect, the application and the controller can be configured to provide the user with capability of setting the sensitivity by the user entering, e.g., on a smart phone via Bluetooth or equivalent, an actual deceleration value, e.g., 0.1 G, 0.2 G, etc. Configurability can include providing the user with an ability to switch the system off. Configurability can also include providing the user the ability to adjust brightness intensity, brake light activation pattern, including lettering, and turn signal activation pattern. Configurability can include providing the LEL array a different brightness intensity or pattern depending on whether the activation is based on a brake signal received from the vehicle or based on a deceleration signal measured by the accelerometer. In an aspect, configurability can include providing the user with a capability of setting the vehicle lean predicament threshold, as discussed above in reference to blocks 909 and 910 of FIG. 9.

It will be understood by persons of ordinary skill, upon reading this disclosure, that implementations as described above can include, and can provide, in a single integrated structure encased by a housing, for example, the housing 101, a multi-axis accelerometer coupled to a processor that is coupled to a light bar having an LEL array, and that can provide, in combination, an integrated user-configurable, user-updatable, brake light that can be activated by user application of friction brakes and by detection of vehicle deceleration from other causes, e.g., downshifting, and vehicle turn signals, ordinary tail light, and hazard light activation upon vehicle lean indicating an accident.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle safety lighting system, comprising:
   a multi-axis accelerometer, mechanically coupled to a vehicle, configured to detect acceleration of the vehicle along each of a plurality of axes, the axes including a first axis, and a second axis that is normal to the first axis, and to output a corresponding plurality of acceleration measurements, the acceleration measurements include a first axis acceleration measurement and a second axis acceleration measurement;
   a controller, coupled to the multi-axis accelerometer, and configured to:
      apply a reference frame filtering process configured to generate, based at least in part on the first axis acceleration measurement and the second axis acceleration measurement, a filtered first axis acceleration measurement and a filtered second axis acceleration measurement, the filtered first axis acceleration measurement being aligned with an axial direction of the vehicle, and the filtered second axis acceleration measurement being aligned with a lateral axis, the lateral axis being normal to the axial direction of the vehicle, determine a vehicle deceleration, based only on the filtered first axis acceleration measurement, and detect the vehicle deceleration exceeding a brake light activation threshold and, based at least in part on said detection, output a deceleration light signal; and a light emitting element (LEL) array, including a plurality of LELs coupled to the controller, the LEL array being configured to receive the deceleration light signal, and in response, emit a deceleration light.

2. The vehicle safety lighting system of claim 1, wherein the controller is further configured to detect, based at least in part on the filtered second axis acceleration measurement, a turning of the vehicle, and based at least in part on the detecting turning of the vehicle, to preempt output of the deceleration light activation signal.

3. The vehicle safety lighting system of claim 1, wherein:

the plurality of axes further includes a third axis, the third axis being normal to the first axis and normal to the second axis, the plurality of measurements further includes a third axis acceleration measurement, and the reference frame filtering process is further configured to generate, based at least in part on the first axis acceleration measurement, the second axis acceleration measurement, and the third axis acceleration measurement, a filtered third axis acceleration measurement, the filtered third axis acceleration measurement being aligned with a direction of gravity.

4. The vehicle safety lighting system of claim 3, wherein the controller is further configured to detect, based at least in part on the filtered first axis acceleration measurement, the filtered second axis acceleration measurement, and the filtered third axis acceleration measurement, a leaning of the vehicle, and based at least in part on the detected leaning of the vehicle, to preempt output of the deceleration light activation signal.

5. The vehicle safety lighting system of claim 3, wherein the controller is further configured to detect, based at least in part a combination of the second axis acceleration measurement and the third axis acceleration measurement, a leaning of the vehicle being greater than a vehicle lean predicament threshold; and upon detecting the leaning of the vehicle being greater than the vehicle lean predicament threshold, to activate LELs from among the LEL array according to a hazard lighting configuration.

6. The vehicle safety lighting system of claim 5, wherein:

the LEL array includes a plurality of amber LELs, and the hazard lighting configuration includes activating at least a sub-plurality of amber LELs according to a hazard flashing sequence.

7. The vehicle safety lighting system of claim 1, wherein:

the multi-axis accelerometer is configured to output the first axis acceleration measurement and the second axis acceleration measurement as, respectively, a first axis acceleration signal and a second axis acceleration signal, the first axis acceleration signal being a continuous analog signal and the second axis acceleration signal being a continuous analog signal, the controller further includes an analog-to-digital (A/D) converter, configured to sample the first axis acceleration signal, and sample the second axis acceleration signal, and output as a result, respectively, a sequence of first axis acceleration samples and a sequence of second axis acceleration samples, the reference frame filtering process is further configured to generate the filtered first axis acceleration measurement as filtered first axis acceleration samples.

8. The vehicle safety lighting system of claim 7, wherein the reference frame filtering process is further configured to apply a noise filter process to the first axis acceleration samples and to the second axis acceleration samples and generate, respectively, corresponding noise filtered first axis acceleration samples, and noise filtered second axis acceleration samples, and generate the filtered first axis acceleration samples and the filtered second axis acceleration samples by applying a reference axis rotation filter to at least the noise filtered first axis acceleration samples, and the noise filtered second axis acceleration samples, and outputting, respectively, the filtered first axis acceleration samples and filtered second axis acceleration samples.

9. The vehicle safety lighting system of claim 7, wherein:

the plurality of axes further includes a third axis, the third axis being normal to the first axis and normal to the second axis, the plurality of measurements further includes a third axis acceleration signal, the third axis acceleration signal being a continuous analog signal, the A/D converter is further configured to sample the third axis acceleration signal and to output, as a result, a sequence of third axis acceleration samples, and the controller is further configured to apply the reference frame filter to the first axis acceleration samples, the second axis acceleration samples, and the third axis acceleration samples, and to generate adjusted third axis acceleration samples.

10. The vehicle safety lighting system of claim 9, wherein the reference frame adjustment process is further configured to apply a noise filter process to the first axis acceleration samples, to the second axis acceleration samples, and to the third axis acceleration samples and generate, respectively, corresponding noise filtered first axis acceleration samples, noise filtered second axis acceleration samples, and noise filtered third axis acceleration samples, and generate the filtered first axis acceleration samples, filtered second axis acceleration samples, and filtered third axis acceleration samples by applying the reference axis rotation filter to the noise filtered first axis acceleration samples, the noise filtered second axis acceleration samples, and the noise filtered third axis acceleration samples and outputting, respectively, the filtered first axis acceleration samples, the filtered second axis acceleration samples, and the filtered third axis acceleration samples.

11. The vehicle safety lighting system of claim 9, wherein the controller is further configured to:

detect, based at least in part on the filtered first axis acceleration samples, the filtered second axis acceleration samples, and the filtered third axis acceleration samples, a leaning of the vehicle, and based at least in part on the detecting leaning of the vehicle, to preempt output of the deceleration light activation signal.

12. The vehicle safety lighting system of claim 11, wherein the system further includes:

an interface to the controller, configured to receive an updated brake light activation threshold, and wherein the controller is further configured to change the brake light activation threshold according to the updated brake light activation threshold.

13. The vehicle safety lighting system of claim 11, wherein:
the array of LELs is mounted to a first support surface of a support substrate, and
the controller is mounted to a second support surface of the support substrate, opposite the first support surface.

14. The vehicle safety lighting system of claim 11 wherein:
the controller is further configured to generate a tail light mode signal,
at least a sub-plurality of LELs among the array of LELs is configured to receive the tail light mode signal and, in response, emit a tail light, and
the array of LELs and the sub-plurality of LELs among the array of LELs are configured wherein a total light output of the LELs in response to the deceleration light signal exceeds the light output of the tail light.

15. The vehicle safety lighting system of claim 11, wherein the controller is further configured to:
detect, based at least in part on the sequence of second axis acceleration samples, a turning of the vehicle, and
based at least in part on the detecting the turning of the vehicle, to preempt output of the deceleration light activation signal.

16. The vehicle safety lighting system of claim 11, wherein the controller is further configured to:
detect, based at least in part on the sequence of second axis acceleration samples, a leaning of the vehicle, and
based at least in part on the detecting the leaning of the vehicle, to preempt output of the brake light activation signal.

17. The vehicle safety lighting system of claim 11 wherein the controller is further configured to:
detect, based at least in part on a combination of the sequence of filtered first axis acceleration samples and the sequence of filtered third axis acceleration samples, a climbing or descending of an incline by the vehicle, and
based at least in part on the detecting the climbing or descending of an incline by the vehicle, to preempt output of the brake light activation signal.

18. The vehicle safety lighting system of claim 11, wherein:
the LEL support surface include a first lateral region and a second lateral region, arranged symmetrically about a bisector reference line on the LEL support surface,
the array of LELs includes a plurality of first lateral region red LELs, mounted on the first lateral region, and a plurality of second lateral region red LELs, mounted on the second lateral region,
the array of LELs further includes a plurality of first lateral region amber LELs, mounted on the first lateral region, and a plurality of second lateral region amber LELs, mounted on the second lateral region, and controller is further configured to:
receive a left turn signal from the vehicle and, in response, activate the first lateral region amber LELs,
receive a right turn signal from the vehicle and, in response, activate the second lateral region amber LELs.

19. A vehicle safety lighting method, comprising:
detecting an acceleration of a vehicle along each of a plurality of axes, the axes including a first axis, a second axis that is normal to the first axis, and a third axis, the third axis being normal to the first axis and normal to the second axis, and generating a corresponding first axis acceleration measurement signal, second axis acceleration measurement signal, and third axis acceleration measurement signal, the first axis acceleration measurement signal, second axis acceleration measurement signal, and third axis acceleration measurement signal being continuous analog signals;
receiving, at a controller, the first axis acceleration measurement signal, second axis acceleration measurement signal, and third axis acceleration measurement signal;
sampling, at the controller, the first axis acceleration measurement signal, second axis acceleration measurement signal, and third axis acceleration measurement signal and outputting as a result, a respective sequence of first axis acceleration samples, sequence of second axis acceleration samples, and sequence of third axis acceleration samples;
generating, at the controller, based at least in part on the sequence of first axis acceleration samples, sequence of second axis acceleration samples, and sequence of third axis acceleration samples, a sequence of filtered first axis acceleration samples, sequence of filtered second axis acceleration samples, and sequence of filtered third axis acceleration samples measurement, the filtered first axis acceleration samples being aligned with an axial direction of the vehicle, and the filtered second axis acceleration samples being aligned with a lateral axis, the lateral axis being normal to the axial direction of the vehicle;
determining a vehicle deceleration, based only on the filtered first axis acceleration samples;
detecting the vehicle deceleration exceeding a brake light activation threshold;
based at least in part on said detecting, outputting a deceleration light signal to an array of light emitting elements (LELs); and
emitting a deceleration light signal from the array of LELs in response to receiving the deceleration light signal.

20. The vehicle safety lighting method of claim 19, wherein
generating the filtered first axis acceleration samples, the filtered second axis acceleration samples, and the filtered third axis acceleration samples includes applying a reference axis rotation filter to the first axis acceleration samples, second axis acceleration samples, and third axis acceleration samples and outputting, respectively, the filtered first axis acceleration samples, filtered second axis acceleration samples, and filtered third axis acceleration samples.

* * * * *

UNITED STATES PATENT AND TRADEMARK OFFICE
CERTIFICATE OF CORRECTION

| | | |
|---|---|---|
| PATENT NO. | : 10,363,865 B2 | Page 1 of 1 |
| APPLICATION NO. | : 15/966123 | |
| DATED | : July 30, 2019 | |
| INVENTOR(S) | : David Bartell and Catalin Nicolae Petrescu | |

It is certified that error appears in the above-identified patent and that said Letters Patent is hereby corrected as shown below:

On the Title Page

At (71), Applicant "Ardmore Lighting, LLC" should be --Admore Lighting, Inc.--.

At (73), Assignee "Admore Lighting, LLC" should be --Admore Lighting, Inc.--.

Signed and Sealed this
First Day of September, 2020

Andrei Iancu
*Director of the United States Patent and Trademark Office*